(12) United States Patent
Schwartze

(10) Patent No.: US 7,218,615 B2
(45) Date of Patent: May 15, 2007

(54) METHOD AND SYSTEM FOR THE CONFIGURATION OF A COMMUNICATION LINK-UP

(75) Inventor: Juergen Schwartze, Dortmund (DE)

(73) Assignee: Siemens Aktiengesellschaft, Munich (DE)

( * ) Notice: Subject to any disclaimer, the term of this patent is extended or adjusted under 35 U.S.C. 154(b) by 1111 days.

(21) Appl. No.: 10/189,196

(22) Filed: Jul. 5, 2002

(65) Prior Publication Data

US 2003/0039253 A1 Feb. 27, 2003

(30) Foreign Application Priority Data

Jul. 4, 2001 (DE) .................. 101 32 272

(51) Int. Cl.
*H04L 12/28* (2006.01)
*H04L 12/56* (2006.01)
*G06F 15/177* (2006.01)

(52) U.S. Cl. .................. 370/254; 370/401; 709/220
(58) Field of Classification Search ............ None
See application file for complete search history.

(56) References Cited

U.S. PATENT DOCUMENTS 6,070,187 A * 5/2000 Subramaniam et al. ..... 709/220

2002/0161867 A1* 10/2002 Cochran et al. ............ 709/221
2002/0161883 A1* 10/2002 Matheny et al. ............ 709/224

FOREIGN PATENT DOCUMENTS

DE 199 42 465 A1 3/2001
EP 0 946 027 A2 9/1999

\* cited by examiner

*Primary Examiner*—Wing Chan
*Assistant Examiner*—Warner Wong
(74) *Attorney, Agent, or Firm*—Staas & Halsey LLP

(57) ABSTRACT

A method for the configuration, particularly for the initial configuration, of a communication link-up for transmitting voice and/or user data, comprising the following method steps: a) defining a Config message as configuration IP packet on the administration server; b) transmitting the Config message to the primary network component having proxy capability; c) automatic configuring of the latter; d) forwarding of the Config message to at least one secondary network component, and e) automatic configuring of the latter.

18 Claims, 2 Drawing Sheets

FIG 2

Figure 1:
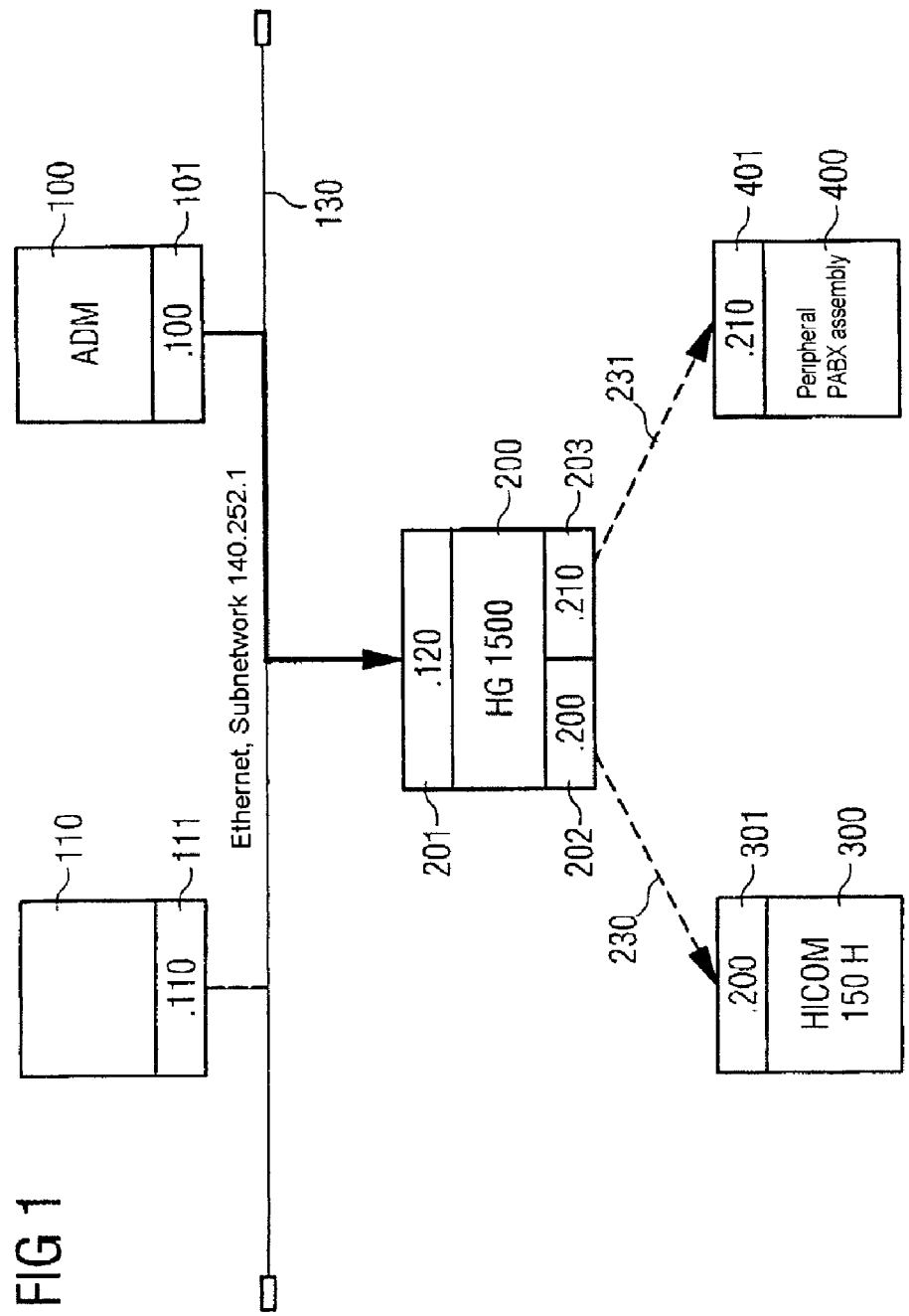

| Message element | Used by: | Used for: |
|---|---|---|
| Ethernet address of the primary network component | Primary network component | Own Ethernet interface and proxy interfaces |
| IP address of the primary network component | Primary network component | Own IP address<br>Own default gateway |
| IP address of the secondary network component | Primary network component<br>Secondary network component | IP address of the proxy interface<br>Own IP address |
| Common subnetwork mask | Primary network component<br>Secondary network component | Own subnetwork mask<br>Own subnetwork mask |
| Default gateway | Primary network component | Own default gateway |

METHOD AND SYSTEM FOR THE CONFIGURATION OF A COMMUNICATION LINK-UP

CROSS REFERENCE TO RELATED APPLICATIONS

This application is based on and hereby claims priority to German Application No. 101 32 272.0 filed on Jul. 4, 2002, the contents of which are hereby incorporated by reference.

BACKGROUND OF THE INVENTION

The invention relates to a method for the configuration, particularly the initial configuration, of a communication link-up for transmitting voice and/or user data.

If network components (data terminals), which in their spatial system are installed in a building or in the grounds of the company, are connected to one another in a data network, such a data network is called a local area network (LAN) in the literature. In large networks (LANs), the number of jointly used resources (hard disks, files, printers, communication servers, gateways etc.) increases very rapidly which results in high administrative expenditure for the network, the jointly used resources must be clearly presented so that the network facilitates the work for the users.

This problem can only be solved by a logical administrative structure. In the current network operating systems, the two different approaches of the Directory Services (Novell Network) and of the domains (Windows NT Server, IBM LAN Manager) generally exist for this purpose. In principle, it applies to all Unix variants (derivatives) such as SCO Unix, Solaris, IBM AIX, HPUX or Linux that the network capability is already integrated into the core of the system. This allows both own networks to be set up and linking to other servers.

So that all data networks or device units used in a network can be unambiguously identified, certain addresses are in each case allocated to them which are called nodes. As a rule, the node addresses are permanently entered on the network cards (interfaces) used and are unambiguous throughout the world. They are administered at a central location and each manufacturer of such network cards is allocated a particular batch of numbers to be used. For Ethernet network cards, a 48-bit MAC (Media Access Control) address is specified which enables an interface to be unambiguously identified.

To structure an LAN meaningfully from the point of view of simple administration or allocation of network components to certain work groups or projects, IP addresses are issued to the individual network components during the configuration, particularly during the initial configuration of an LAN, which addresses unambiguously identify these components in a domain or subdomain and provide for communication between them, e.g. on the basis of the TCP/IP protocol. The individual network components are normally not set up directly on site which would mean considerable personnel and time expenditure but remotely by an administration server on which, as a rule, the network operating system is running.

For this purpose, current network operating systems provide the network administrator with an extensive selection of functions such as, e.g., the IVWADMIN, IVWUSER, SYSCONW etc. in Novell Netware, by which new network components (initial configuration) can be integrated and users, storage media, printers etc. can be administered under one graphic interface. To configure network components in an (Ethernet) LAN, the corresponding service programs use standard functions such as (proxy) ARP (Address Resolution Protocol) for recognizing the MAC address allocated to an IP address for administering the network. Conversely, the IP address for a MAC address is recognized in RARP (Reverse Address Resolution Protocol). Diskless systems such as, e.g., X terminals or diskless workstations load their operating system via the network from an operating system server, initially requesting an IP address allocated to their MAC address by BOOTP (Bootstrap Protocol).

Structured communication networks by which data of all types are transmitted to the desired, addressee are becoming more and more important within the companies and organizations.

"Telephony by Internet" (IP telephony) via the intranets of the companies or organizations is also playing an ever more important role. However, this presupposes that existing LANs which may be widely separated are coupled via long-distance links to form a WAN (Wide Area Network). The problems associated with this are not only a possible heterogeneity of the linked networks due to different physical transmission media, network architectures (BUS or Token Ring), types of protocols and operating systems but also the configuration and administration, particularly the initial configuration, of such communication link-ups.

Usually, two LANs are coupled by a point-to-point connection between a primary network component (Gateway, Router) directly linked to an LAN and a secondary network component directly linked to the second LAN. On this point-to-point link, transmission protocols such as the PPP (Point-to-Point Protocol) or SLIP (Serial Line Internet Protocol) are used. The primary network component having direct access to the data network is usually provided with a so-called proxy capability—proxy ARP in the TCP/IP environment—in such systems. Whereas the primary component can be automatically initially configured with the respective mechanisms of the data network such as RARP or BOOTTP in the case of TCP/IP, such automation is not available for the network components indirectly linked (secondary network components). Thus, a simple initial configuration of a communication link-up structured in this manner does not allow the secondary network components to be reached from a network.

Although the access parameters of each network component without direct access to the network can be configured in a proprietary manner, i.e. manually and directly at the device, for the linking-up to the network, this is time-consuming and uneconomic, especially in the case of WANs with a spatial extent which is considerable in some cases. Another possibility relates to predefining a so-called default configuration of the network components without direct access to the data network. However, this gives rise to the problem that a communication link-up must not then contain a number of network components of the same type because unambiguousness in the addressing would no longer be given.

From German Offenlegungsschrift DE 199 42 465 A1, a method for issuing IP addresses in communication networks is known. The communication network here comprises a configuration computer, a number of gateways and subscriber facilities connected to the gateways. According to the method, the gateways are configured in a first step and the subscriber facilities are configured in a second step. By way of example, the first switch is configured by a data transmission D1, i.e. supplied with its IP address, for example. The first switch then acquires all Ethernet addresses of the subscriber facilities connected to it, together with the respective assignment to the port, and sends these to the configuration computer by a data packet D3. It is only after it has received the data packet D3 that the configuration computer transmits the IP addresses to the subscriber facilities by the transmission D2.

Furthermore, a method for configuring network nodes is known from European Offenlegungsschrift EP 946 027 A2, in which the network nodes are configured in such a manner that they are their own default gateway.

SUMMARY OF THE INVENTION

It is one possible object of the present invention to provide a method and a system which allows a simple configuration, particularly an initial configuration, for integrating primary and secondary network components in a data network by remote access.

This object is achieved by a method having the method steps a) defining a Config message as configuration IP packet on the administration server; b) transmitting the Config message to the primary network component having proxy capability; c) automatic configuring of the primary network component by the Config message; d) forwarding the Config message to at least one secondary network component; and e) automatic configuring of the at least one secondary network component with respect to its access to the data network via the primary network component.

According to one aspect of the invention, an essential element is the definition of the Config message which is sent to the primary network component by an administration computer in the data network but contains all relevant configuration parameters for the data network access of the primary network component and all associated secondary network components. In this context, the existing mechanisms for initial configuration of a component having direct access to the data network, which correspond to the prior art, are extended in order to cause this component, on the one hand, automatically to set up its proxy functions and, on the other hand, also to cause the components without direct data network access connected to it to automatically self-configure its access to the data network.

A significant advantage lies in the fact that the functions of the simple standard mechanisms are fully retained and can still be used unrestrictedly in the stand-alone operation of a network component without proxy tasks. An administrator is now enabled to set up a link-up from a directly accessible network component with proxy capability and one or more further network components which can only be reached via the proxy, with minimum additional expenditure compared with an automatic initial configuration of a single component. The procedure of the initial configuration of such a link-up thus becomes simpler, more transparent and quicker for the user or, respectively, is only made possible by remote.

Steps a) to e) are preferably carried out on the basis of extended standard configuration components, particularly on the basis of RARP or BOOTP. The method is thus based on configuration components which exist as a standard feature in the field of Ethernet and Token Ring access methods. The field of application of the method is thus not restricted to highly specialized network types and transmission protocols since, in particular, the TCP/IP protocol is used most widely on the basis of Ethernet or Token Ring.

It is also of particular advantage that the Config message can be sent simultaneously or successively in time to a number of primary network components in step b) of the method. It is particularly in the initial configuration of a data network containing primary and secondary network components that a network administrator can first assemble all relevant configuration data for interconnecting one or more primary network components with correspondingly one or more secondary network components. The setting-up of the network components, and thus the interconnecting of possibly a number of data networks can then be carried out by remote access in one step without greater expenditure. This can be of advantage not only for the initial configuration of a data network but also for the new configuration due to restructuring or fusion of a company with branches or production centers still to be interconnected to the data network.

In a particularly preferred manner, the automatic configuring of the primary network component is carried out in the abovementioned step c) by carrying out steps c1) reading the configuration data out of the Config message; c2) recognizing the configuration data which are allocated to the primary network component; c3) taking an IP interface and at least one proxy interface into operation and c4) writing at least one proxy interface ID into the Config message. The primary network component is able to recognize the Config message intended for it by the Ethernet address of its network card and identify its associated configuration data. Using these data, the primary network component then takes into operation both its own IP interface and the proxy interfaces. The respective proxy interface ID is written into the Config message for evaluation by the secondary network component in order to provide for a connection between the secondary network component and the primary network component.

The automatic configuring of the at least one secondary network component in step e) is carried out in a preferred manner by passing through steps e1) reading the configuration data out of the Config message; e2) recognizing the configuration data which are allocated to the respective secondary network component; and e3) taking the IP interface into operation. The secondary network component recognizes its associated configuration data which are to be used for taking its IP interface into operation from the associated proxy interface ID of the primary network component. During the automatic configuring of the primary and the secondary network component, the arrival of the Config message triggers the configuration process with the steps described. Manual intervention by the network administrator in the on-site system is thus no longer necessary.

After the IP interfaces of primary and secondary network components have been taken into operation, that is to say after step e) of the method has been passed through, further inter-network configuration measures are carried out with the usual tools, particularly by remote access in a preferred manner. Due to the fact that the secondary network components can now be reached via the primary network components, it is possible to use applications such as Telnet (Remote Terminal Access), FTP (File Transfer Protocol), SNMP (Simple Network Management Protocol), DNS (Domain Name System) or NFS (Network File System) for complete initial administration via the data network by remote access.

The object may also achieved by a system for carrying out the method described which comprises an administration program which is running on the administration server and is interactively operable for inputting configuration data for primary and secondary network components. It also exhibits a first configuration program, running on the primary network component, for automatically configuring the primary network component and a second configuration program, running on the at least one secondary network component, for automatically configuring the secondary network component.

The administration program and first and second configuration program for the primary and secondary network component, respectively, are based on known standard mechanisms of the network layer (layer 3 of the OSI reference model) such as ARP (Address Resolution Protocol). Enabled by corresponding extensions of the network component with direct access to the data network, they, on the one hand, automatically set up their proxy function and, on the other hand, also enable the network components without direct data network access connected to them to automatically self-configure their access to the data network. The configuration program of the primary network component with proxy functions forwards the Config message to all secondary network components connected (Config message forwarding).

The administration program preferably comprises for a unit to input configuration data of a primary network component and at least one secondary network component by the user; a unit to generate a Config message which contains the configuration data, and a unit to send the Config message to the secondary network component. The unit to input configuration data can contain both the inputting in command line mode and the inputting into an interactive graphic interface (Wizard). The unit to input, generating and sending the Config message of the administration program can be available in the form of a closed run-time program and/or in the form of e.g. a Unix Shellscript.

The set-up format of the Config message is preferably structured in such a way that, as a result, the primary network component is activated, on the one hand, for automatically configuring and, on the other hand, for forwarding the Config message. In this system, an allocation to the primary network component can be performed with the additional activation of the Config message forwarding at the corresponding position or by correspondingly identifying the configuration data in the set-up format of the Config message.

For the automatic configuration of the primary and secondary network components, the configuration data of the Config message preferably exhibit the message elements Ethernet address of the primary network component, IP address of the primary network component, IP address of at least one secondary network component, common subnetwork mask and default gateway. Thus, all necessary configuration data for linking secondary network components connected to a primary network component to a common data network are available.

A Config message set up in this way is primarily used for automatic configuration by the first configuration program for which purpose a unit to read the Config message, a unit to recognize the configuration data which are allocated to the primary network component and a unit to take the IP interface and the at least one proxy interface of the primary network component into operation are provided. Furthermore, a unit to write at least one proxy interface ID into the Config message and a unit to send the Config message (Config message forwarding) to at least one secondary network component are part of the configuration program of the primary network component. All units presented here can be implemented both in the form of a closed run-time program and/or e.g. in the form of a Unix Shellscript.

The second configuration program for the automatic configuration of the secondary network component also preferably exhibits a unit to read the Config message, a unit to recognize the configuration data which are allocated to the respective secondary network component and a unit to take the IP interface of the respective secondary network component into operation. In conjunction with the specific set-up format of the Config message, the second configuration program recognizes from the proxy interface ID written by the first configuration program which configuration data are to be allocated to the secondary network component. Here, too, the units of the second configuration program described can be implemented in the form of a self-contained run-time program and/or, e.g., as Unix Shellscript.

For the administration program and/or the first configuration program and/or the second configuration program, standardized configuration components, particularly RARP and BOOTP are preferably used. This makes it possible for such a chain of programs successively called up to run on all computer systems with TCP/IP interconnection on the basis of the Ethernet access.

These and other objects and advantages of the present invention will become more apparent and more readily appreciated from the following description of the preferred embodiments, taken in conjunction with the accompanying drawings of which:

FIG. 1 shows an administration server 100 via which a primary network component 200 and two other secondary network components 300, 400 connected to the primary network component are administered, and FIG. 2 shows an overview of the message elements of the configuration data used and how they are used.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

FIG. 1 shows an integration of the method according to one aspect of the invention and of a system for carrying out this method in a section in a telecommunication link-up currently being developed on the basis of the Hicom 150 H PABX system. An administration server 100 can be seen which is connected directly via an Ethernet interface (an Ethernet network card) 101 to a subnet 130 with the network identity 140.252.1. The administration server 100 is addressed with the IP address 140.252.1.100.

The Ethernet 130 is also connected to, e.g. a database server 110 with an Ethernet interface 111 which carries the IP address 140.252.1.110. The Ethernet 130 is also directly connected to a primary network component (proxy) 200 with an Ethernet interface 201 which is addressed with the IP address 140.252.1.120. The primary network component 200 is an LAN assembly HG 1500 which, on the one hand, acts as gateway to the Ethernet 130 and, on the other hand, is connected via proxy interfaces 202 and 203 as router via point-to-point data lines 230 and 231 to secondary network components 300 and 400 via their point-to-point interfaces 301 and 401.

In the case of the secondary network component 300, the embodiment shown is a Hicom 150 PABX private branch exchange to which, e.g., telephone devices can be connected. The primary network component 200 operates as proxy for the Hicom 150 PABX behind it and a further secondary network component 400, e.g. a peripheral PABX assembly. Such a system is then initially configured in such a manner that in default mode (initial system start-up) the primary network component 200 has its fixed unambiguous Ethernet address (MAC address) but not an IP address.

The network administrator inputs the following data into an administration program running on the administration server 100:

Ethernet address (MAC address) of the primary component 200 (HG 1500) which is printed on the device;
IP address of the primary component 200 (HG 1500);
IP address of the components 300 (Hicom 150H) and 400 (other secondary network component);
Common subnetwork mask for IP interfaces 201, 301 and 401;
Default gateway of the IP network which can be, e.g., the IP address of the primary network component 200 if it can manage IP routing.

The administration program (Wizard) generates from this a configuration IP packet (Config message) and sends it to the primary component 200. The latter starts up its own IP interface 201 and the proxy interfaces 202 and 203 for the secondary network components 300 and 400. It then enters the proxy interface ID (MAC address) into the Config message and forwards it by a proprietary mechanism, that is to say not via the data network but via the serial data lines 230 and 231 (V.24) in this case, to the secondary components 300 and 400. The latter use the data of the primary component 200, that is to say of the proxy, as their default gateway.

The primary network component 200 and the two secondary network components 300 and 400 are thus configured and can be addressed with their associated IP addresses by the administration server 100. On-site initial configurations at the corresponding secondary network component 300 or 400 are thus superfluous and the system shown can be initially configured by remote access by the administration server 100 alone. On the serial data lines 230 and 231, either the PPP (Point-to-Point Protocol) or SLIP (Serial Line Internet Protocol) can be used during this process.

FIG. 2 shows an overview of the message elements of the configuration data and how they are used. During the initial configuration of a system according to FIG. 1, the Ethernet address (MAC address) of the primary network component 200 is used by the latter for setting up and taking into operation its own Ethernet interface 201 and proxy interfaces 202 and 203. The IP addresses of the primary network component 200 are used by the latter as its own IP address 140.252.1.120 and, if necessary, as its own default gateway. The IP addresses of the secondary network components 300 and 400 are used by the primary network component 200 as IP address of the proxy interfaces 202 and 203 and by the secondary network components 300 and 400 as their own IP address 140.252.1.200 and 140.252.1.210. The common subnetwork mask of the Ethernet 130, e.g. 255.255.255.0 in the case of network identity 140.252.1, is used as its own subnetwork mask by the primary network component 200 and also as their own subnetwork mask by the secondary network components 300 and 400. For the primary network component 200, the default gateway 140.252.1.120 is considered as its own default gateway.

The invention has been described in detail with particular reference to preferred embodiments thereof and examples, but it will be understood that variations and modifications can be effected within the spirit and scope of the invention.

What is claimed is:

1. A method for configuring of a communication link-up for transmitting data through a data network, comprising:
   defining a Config message containing configuration data and configuration parameters that enable a primary network component and a secondary network component to access the data network, the primary network component having proxy capability being directly connected to the data network, and the secondary network component being indirectly connected to the data network via the primary network component, the Config message being defined as a configuration IP packet at an administration server, the administration server being directly connected to the data network;
   transmitting the Config message to the primary network component;
   automatically configuring the primary network component based on the Config message such that the primary network component can access the data network using access data belonging to the primary network component;
   forwarding of the Config message via the primary network component to the secondary network component; and
   automatically self-configuring the secondary network component with respect to accessing the data network via the primary network component, such that the secondary network component can access the data network using the access data of the primary network component, and the primary network component is a default gateway for the secondary network component.

2. The method as claimed in claim 1, wherein the access data of the primary network component serves as the default gateway for the secondary network component.

3. The method as claimed in claim 1, wherein the method is carried out on the basis of extended standard configuration components.

4. The method as claimed in claim 3, wherein the method is carried out in accordance with a reversed address resolution protocol or a boot strap protocol.

5. The method as claimed in claim 1, wherein the Config message is transmitted simultaneously to a number of primary network components.

6. The method as claimed in claim 1, wherein the Config message is transmitted successively in time to a number of primary network components.

7. The method as claimed in claim 1, wherein automatically configuring the primary network component comprises:
   reading the configuration data out of the Config message;
   recognizing which configuration data are allocated to the primary network component;
   placing an IP interface and at least one proxy interface corresponding to the secondary network component into operation; and
   writing at least one proxy interface ID for the secondary network component into the Config message.

8. The method as claimed in claim 1, wherein there are a plurality of secondary network components.

9. The method as claimed in claim 1, wherein automatically self-configuring the secondary network component comprises:
   reading the configuration data out of the Config message;
   recognizing which configuration data are allocated to the secondary network component, and
   placing an IP interface for the secondary network component into operation.

10. The method as claimed in claim 1, wherein after the secondary network component is automatically self-configured, additional configuration measures are performed by accessing the secondary network component through the data network via the primary network component.

11. A system to configure a communication link-up to transmit data through a data network, comprising:
- an administration server directly connected to the data network, to define and transmit a Config message containing configuration data and configuration parameters for a primary network component and at least one secondary network component, the Config message being defined as a configuration IP packet,
- the primary network component having proxy capability and being directly connected to the data network, to receive the Config message from the administration server, the primary network comprising:
  - a configuration unit to automatically configure the primary network component based on the Config message such that the primary network component can access data network using access data belonging to the primary network; and
  - a transmit unit to forward the Config message to the secondary network component; and
- the secondary network component indirectly connected to the data network via the primary network component, to receive the Config message forwarded by the transmit unit of the primary network component, the secondary network component having a configuration unit to automatically self-configure the secondary network component with respect to accessing the data network via the primary network component, such that the secondary network component can access the data network using the access data of the primary network component and the primary network component is a default gateway for the secondary network component.

12. The system as claimed in claim 11, wherein the administration server comprises:
- an input unit to input configuration data of the primary network component and the secondary network component by a user;
- a generation unit to generate the Config message, and
- a transmit unit to send the Config message to the primary network component.

13. The system as claimed in claim 12, wherein the Config message has a set-up format by which the primary network component is activated to automatically configure and to forward the Config message to the secondary network component.

14. The system as claimed in claim 11, wherein the configuration data comprises:
- an Ethernet address of the primary network component;
- an IP address of the primary network component;
- an IP address of the secondary network component;
- a common subnetwork mask; and
- a default gateway.

15. The system as claimed in claim 11, wherein the primary network component has an IP interface and at least one proxy interface corresponding to the secondary network component, and
the configuration unit of the primary network component comprises:
- a read unit to read the Config message;
- a recognition unit to recognize which configuration data are allocated to the primary network component;
- an operation unit to place the IP interface and the at least one proxy interface into operation; and
- a writing unit to write at least one proxy interface ID for the secondary network component into the Config message.

16. The system as claimed in claim 11, wherein
the secondary network component comprises an IP interface, and
the configuration unit of the secondary network component comprises:
- a read unit to read the Config message forwarded by the transmit unit of the primary network component;
- a recognition unit to recognize which configuration data are allocated to the secondary network component; and
- an operation unit to place the IP interface of the secondary network component into operation.

17. The system as claimed in claim 11, wherein at least one of the administration server, the primary network component and the secondary network component are configured with a standard protocol.

18. The system as claimed in claim 11, wherein at least one of the administration server, the primary network component and the secondary network component are configured with a reversed address resolution protocol or a boot strap protocol.

* * * * *